US012580141B2

(12) United States Patent
Lee

(10) Patent No.: US 12,580,141 B2
(45) Date of Patent: Mar. 17, 2026

(54) VACUUM CIRCUIT BREAKER IN WHICH LIFT HOOKS ARE ACCOMMODATED

(71) Applicant: LS ELECTRIC CO., LTD., Anyang-si (KR)

(72) Inventor: Moon-Sub Lee, Anyang-si (KR)

(73) Assignee: LS ELECTRIC CO., LTD., Anyang-si (KR)

(*) Notice: Subject to any disclaimer, the term of this patent is extended or adjusted under 35 U.S.C. 154(b) by 264 days.

(21) Appl. No.: 18/284,992

(22) PCT Filed: Mar. 22, 2022

(86) PCT No.: PCT/KR2022/003996
§ 371 (c)(1),
(2) Date: Sep. 29, 2023

(87) PCT Pub. No.: WO2022/211346
PCT Pub. Date: Oct. 6, 2022

(65) Prior Publication Data

US 2024/0170241 A1 May 23, 2024

(30) Foreign Application Priority Data

Mar. 30, 2021 (KR) ........................ 10-2021-0041015

(51) Int. Cl.
*H01H 33/662* (2006.01)
*B66C 1/10* (2006.01)

(52) U.S. Cl.
CPC ......... *H01H 33/66207* (2013.01); *B66C 1/10* (2013.01); *H01H 2033/6623* (2013.01)

(58) Field of Classification Search
CPC ............... H01H 33/662; H01H 33/666; H01H 33/66207; H01H 2033/6623; B66C 1/10; F16B 5/02
(Continued)

(56) References Cited

U.S. PATENT DOCUMENTS 7,124,488 B2 * 10/2006 Ford ...................... H02B 11/12 361/728
7,544,908 B2 * 6/2009 Webb .................. H02B 11/127 361/608
(Continued)

FOREIGN PATENT DOCUMENTS

KR 20130100596 A 9/2013
KR 200485086 Y1 11/2017
(Continued)

OTHER PUBLICATIONS

Translation of KR20130100596 (Original document published Sep. 11, 2013) (Year: 2013).*
(Continued)

*Primary Examiner* — William A Bolton
(74) *Attorney, Agent, or Firm* — K&L Gates LLP

(57) ABSTRACT

The present disclosure relates to a vacuum circuit breaker in which lift hooks are accommodated, the circuit breaker having accommodated lift hooks mounted therein to allow a user to lift the lift hooks and use same whenever necessary, and accommodating the lift hooks after use, thereby improving user convenience. The circuit breaker according to the present invention may comprise: a circuit breaker main body; a plurality of fixing bolts mounted on and fixed to the circuit breaker main body; and the lift hooks, each having a plurality of moving holes into which the plurality of fixing bolts are inserted, and moving along the plurality of moving holes in a sliding manner.

17 Claims, 12 Drawing Sheets

(58) Field of Classification Search
USPC .......................................... 218/139, 140, 118
See application file for complete search history.

(56) References Cited

U.S. PATENT DOCUMENTS

| | | | | |
|---|---|---|---|---|
| 8,247,716 | B2 * | 8/2012 | Weister | H02B 11/10 200/50.26 |
| 10,790,641 | B1 | 9/2020 | Yao et al. | |
| 2012/0199450 | A1 * | 8/2012 | Bower | H02B 11/127 200/50.25 |
| 2016/0141136 | A1 * | 5/2016 | Ashtekar | H01H 33/6661 200/50.01 |
| 2017/0237241 | A1 * | 8/2017 | Benke | G06F 1/16 200/50.23 |
| 2019/0132984 | A1 * | 5/2019 | Huang | G06F 1/18 |

FOREIGN PATENT DOCUMENTS

| | | | |
|---|---|---|---|
| KR | 20190077746 | A | 7/2019 |
| KR | 102203594 | B1 | 1/2021 |

OTHER PUBLICATIONS

International Search Report for related International Application No. PCT/KR2022/003996; action dated Oct. 6, 2022; (2 pages).
Written Opinion for related International Application No. PCT/KR2022/003996; action dated Oct. 6, 2022; (5 pages).

* cited by examiner

VACUUM CIRCUIT BREAKER IN WHICH LIFT HOOKS ARE ACCOMMODATED

CROSS-REFERENCE TO RELATED APPLICATIONS

The present application is a National Stage of International Application No. PCT/KR2022/003996 filed on Mar. 22, 2022, which claims priority to and the benefit of Korean Utility Model Application No. 10-2021-0041015, filed Mar. 30, 2021, the disclosures of which are incorporated herein by reference in its entirety.

FIELD

The present disclosure relates to a vacuum circuit breaker in a lift hook storage type, and more specifically, to a vacuum circuit breaker in a lift hook storage type on which a storage type lift hook is mounted so that the storage type lift hook is moved upward and used whenever a user needs and stored after use so as to improve user convenience.

BACKGROUND

In general, vacuum circuit breakers are electrical protectors which use dielectric strength of vacuum to protect load devices and lines from accident currents when accidents such as short circuits or ground faults occur in electrical circuits.

A vacuum circuit breaker serves to control power transmission and protect power systems and has a large interrupting capacity and high reliability and safety. In addition, since a vacuum circuit breaker may be installed in a small installation space, an application range is relatively wide from a medium voltage to a high voltage.

A vacuum circuit breaker is a machine related to electrical safety, and regular maintenance of the vacuum circuit breaker is performed. That is, simple maintenance of the vacuum circuit breaker may be performed at a test position on a distributing board, but the vacuum circuit breaker is periodically taken out of the distributing board to check whether there is any visual abnormality and a state of a contact part.

FIG. 1 is a perspective view illustrating an exterior of a general vacuum circuit breaker, FIG. 2 is a view illustrating positions at which lift hooks are fastened to the vacuum circuit breaker, and FIG. 3 is a development view for assembling a lift hook of the vacuum circuit breaker. FIG. 4 is a view illustrating the lift hook of the vacuum circuit breaker being assembled, FIG. 5 is a view illustrating the lift hook of the vacuum circuit breaker that is completely assembled, and FIG. 6 is a perspective view illustrating the lift hooks of the vacuum circuit breaker after assembly is completed.

Referring to FIGS. 1 to 6, assembly holes 16 for assembling a plurality of lift hooks 12 and 13 are formed at both sides of a conventional vacuum circuit breaker 10.

In this case, the plurality of lift hooks 12 and 13 include docking structures 15 to be mounted on the vacuum circuit breaker 10.

During the maintenance of the vacuum circuit breaker 10, when the vacuum circuit breaker 10 is to be taken out of a distributing board using crane equipment, in a state in which the vacuum circuit breaker 10 is placed on a flat surface as illustrated in FIGS. 1 and 2, the lift hooks 12 and 13 are mounted on the vacuum circuit breaker 10 as illustrated in FIGS. 3 and 4. That is, as in FIG. 3, the docking structures

15 of the lift hooks 12 and 13 are inserted into the assembly holes 16 of FIG. 4, moved upward along and fitted into small grooves of the assembly holes 16, and fixed using bolts 14 as in FIG. 5. In this case, as in FIG. 6, the lift hooks 12 and 13 are fixedly mounted at both sides of the vacuum circuit breaker 10.

As described above, when maintenance of the conventional vacuum circuit breaker 10 is performed, the lift hooks 12 and 13 are mounted on the conventional vacuum circuit breaker 10, and a crane is used to move the conventional vacuum circuit breaker 10 upward from or downward onto the distributing board. In this case, since it is difficult to fixedly mount the lift hooks 12 and 13 on the conventional vacuum circuit breaker 10, there are cases in which a user may manually hold the conventional vacuum circuit breaker 10, and there is inconvenience that a customer should mount or demount the lift hooks 12 and 13 on or from each vacuum circuit breaker.

SUMMARY

The present disclosure is directed to providing a vacuum circuit breaker in a lift hook storage type on which a storage type lift hook is mounted so that the lift hook is moved upward and used whenever a user needs, and stored after use so as to improve user convenience.

Objectives of the present disclosure are not limited to the above-described objectives, and other objectives and advantages of the present disclosure may be understood from the following descriptions and more clearly understood from embodiments of the present disclosure. In addition, it may be easily seen that the objectives and the advantages of the present disclosure may be realized using elements described in the appended claims and combinations thereof.

One aspect of the present disclosure provides a vacuum circuit breaker including a circuit breaker main body, a plurality of fixing bolts fixedly mounted on the circuit breaker main body, and a lift hook in which a plurality of moving holes are formed and which is moved along the plurality of moving holes in a sliding manner, wherein the plurality of fixing bolts are inserted into the plurality of moving holes.

The plurality of fixing bolts may be fixedly mounted on both sides of the circuit breaker main body.

Each of the plurality of fixing bolts may include a head part and a body part, and a size of the head part may be greater than a thickness of the body part.

In each of the plurality of fixing bolts, the thickness of the body part may be equal to a width of the moving hole or less than the width of the moving hole.

The lift hook may be mounted on both sides of the circuit breaker main body in a state in which the plurality of fixing bolts are inserted into the plurality of moving holes.

The lift hook may include a head part and a body part.

In the lift hook, the plurality of moving holes may be formed in a longitudinal direction of the body part.

The plurality of moving holes may be spaced a predetermined distance from and parallel to each other in the body part.

In the lift hook, a circular hook hole having a predetermined diameter may be formed in the head part.

In the lift hook, a plurality of reinforcing parts for reinforcing strength may be formed on both ends of the body part, and the plurality of reinforcing parts may be formed on both ends of the body part to be parallel to the plurality of moving holes.

In the lift hook, the head part and the body part may be consecutively collinear with each other on a straight line.

In the lift hook, the plurality of moving holes may be formed in a longitudinal direction of the body part, in a normal case, the body part may move downward along the plurality of moving holes, and, when the circuit breaker main body moves, the body part may move upward along the plurality of moving holes.

The head part may be formed to be bent at a predetermined angle with respect to a straight line in a longitudinal direction of the body part.

The head part may be formed to be bent at an angle of 10 degrees to 80 degrees with respect to a line perpendicular to the longitudinal direction of the body part.

In the lift hook, a plurality of first reinforcing parts may be formed on both left and right ends of the head part, and a plurality of second reinforcing parts may be formed on both left and right ends of the body part.

The plurality of first reinforcing parts may have different lengths, and the plurality of second reinforcing parts may have the same length.

According to the present disclosure, when maintenance of a vacuum circuit breaker is performed and crane equipment is used to take the circuit breaker out of or put the circuit breaker in a distributing board or the like, the circuit breaker can be moved upward or downward without using an additional attachment.

According to the present disclosure, since a lift hook is mounted on a vacuum circuit breaker, a user can move the stored lift hook upward and use the circuit breaker whenever the user needs, and store the lift hook on the vacuum circuit breaker again after using the lift hook. Accordingly, since the user does not assemble or carry the lift hook, user convenience can be improved.

In addition to the above-described effects, specific effects of the present disclosure will be described while describing specific embodiments for implementing the disclosure below.

DETAILED DESCRIPTION

Figure 1:
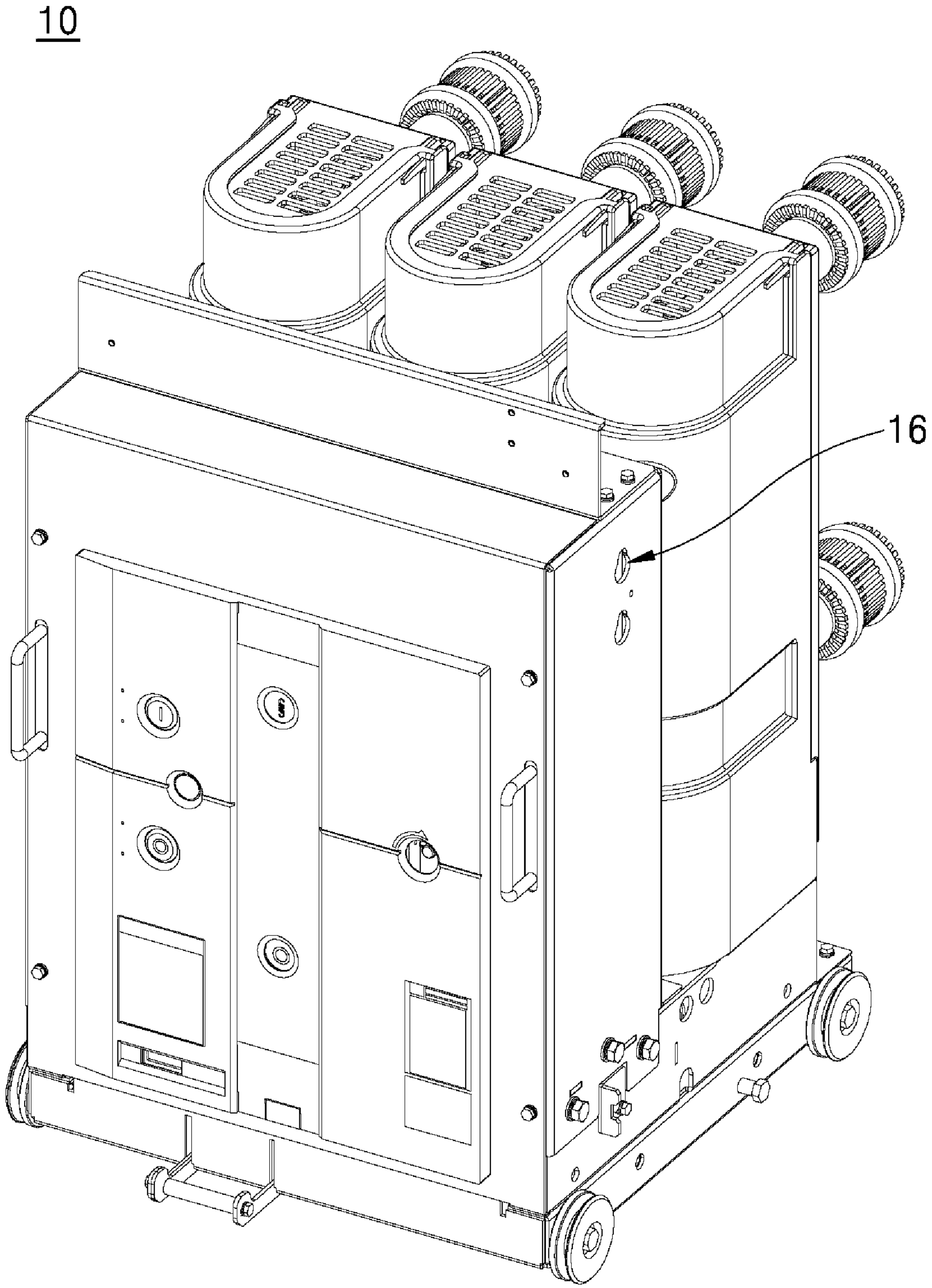
FIG. 1 is a perspective view illustrating an exterior of a general vacuum circuit breaker.
Figure 2:
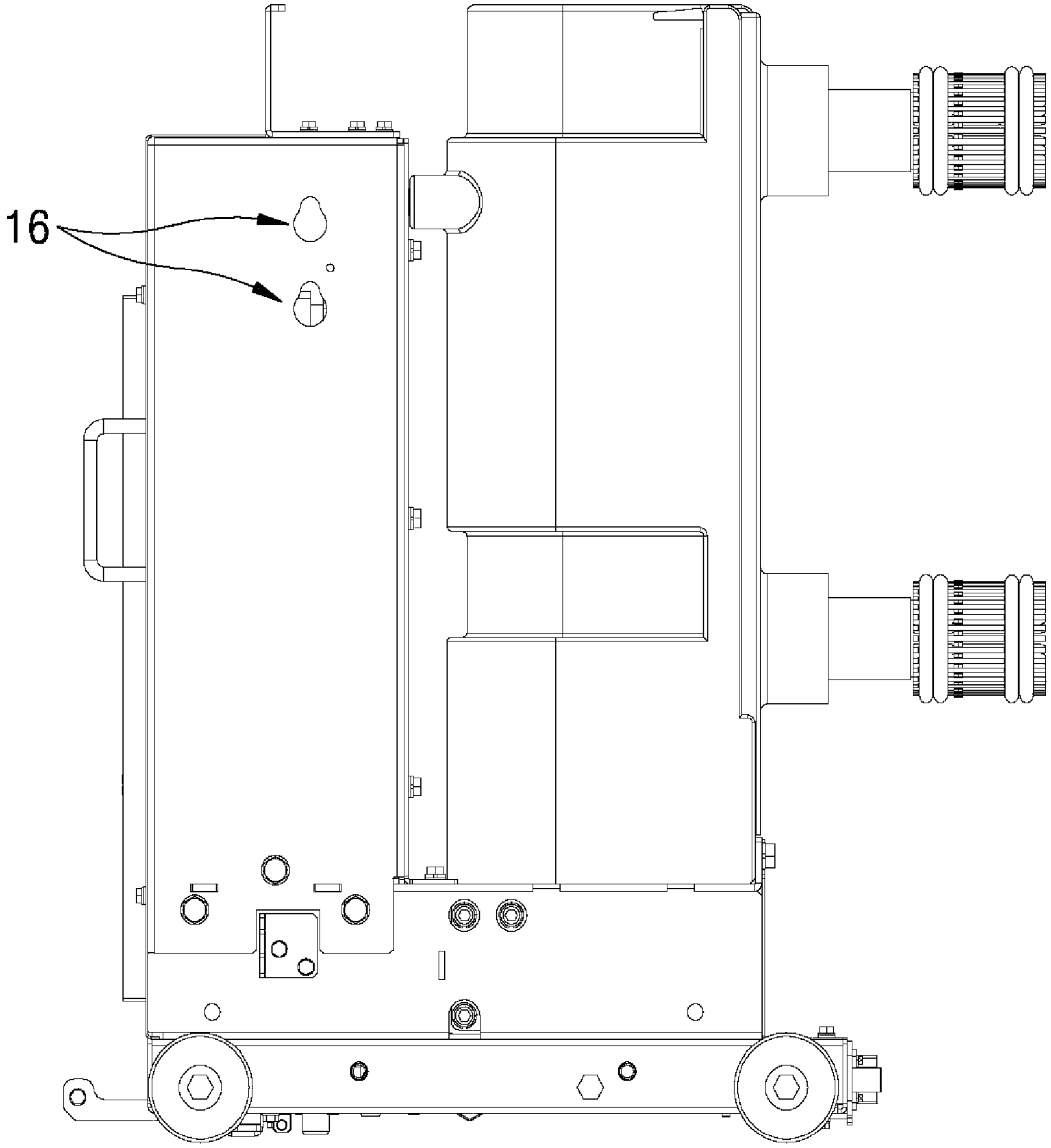
FIG. 2 is a view illustrating positions at which lift hooks are fastened to the vacuum circuit breaker.
Figure 3:
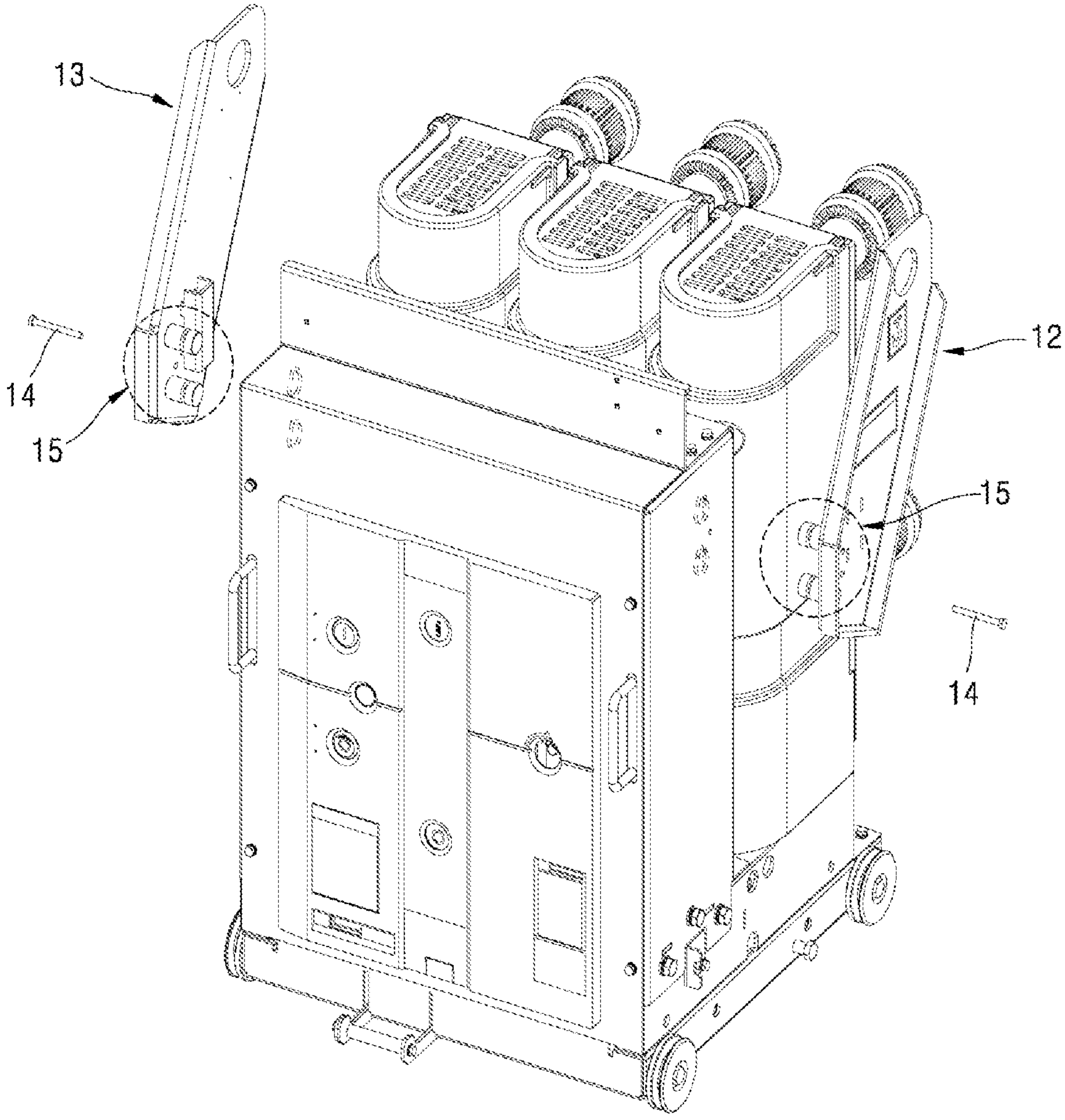
FIG. 3 is a development view for assembling a lift hook of the vacuum circuit breaker.
Figure 4:
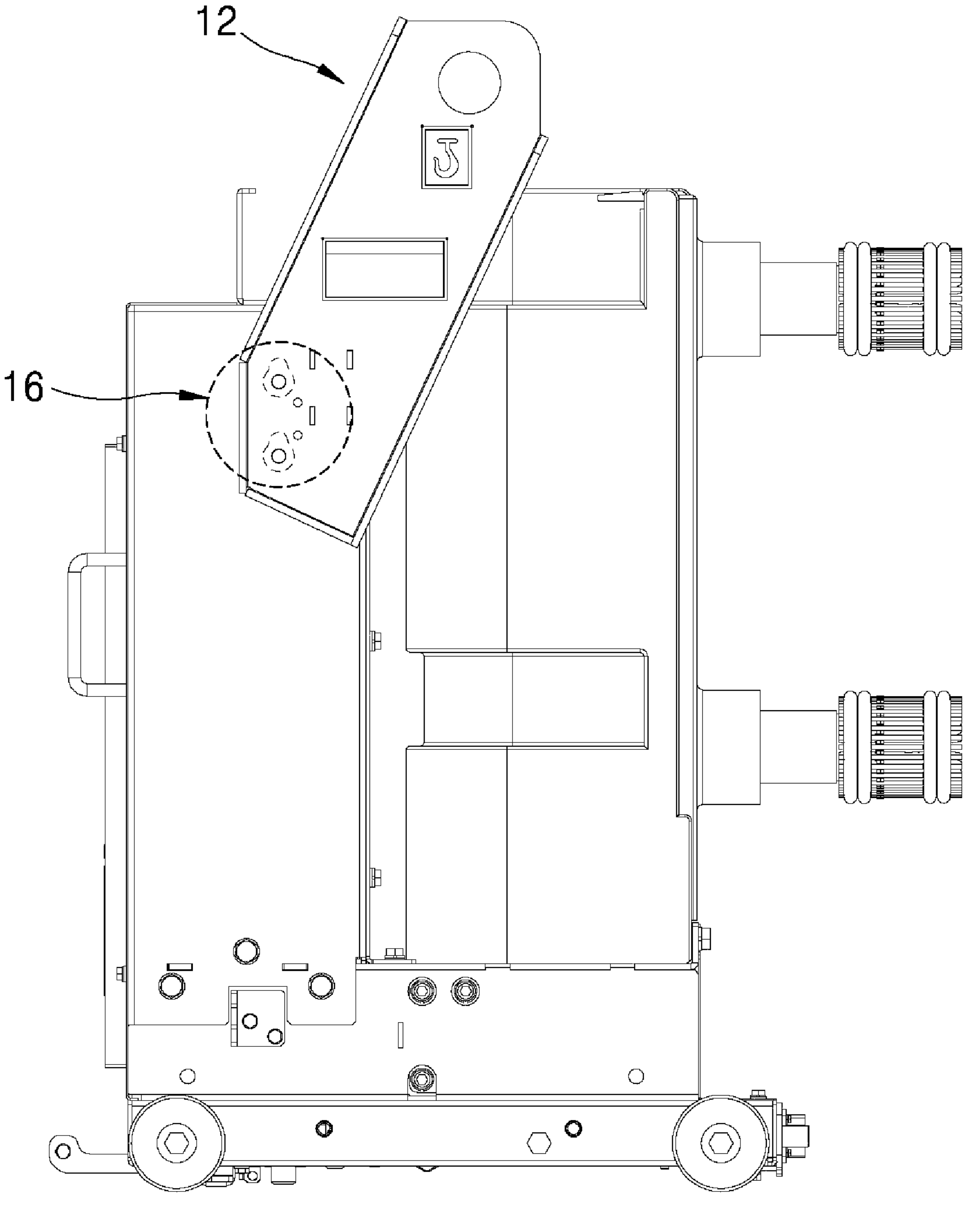
FIG. 4 is a view illustrating the lift hook of the vacuum circuit breaker being assembled.
Figure 5:
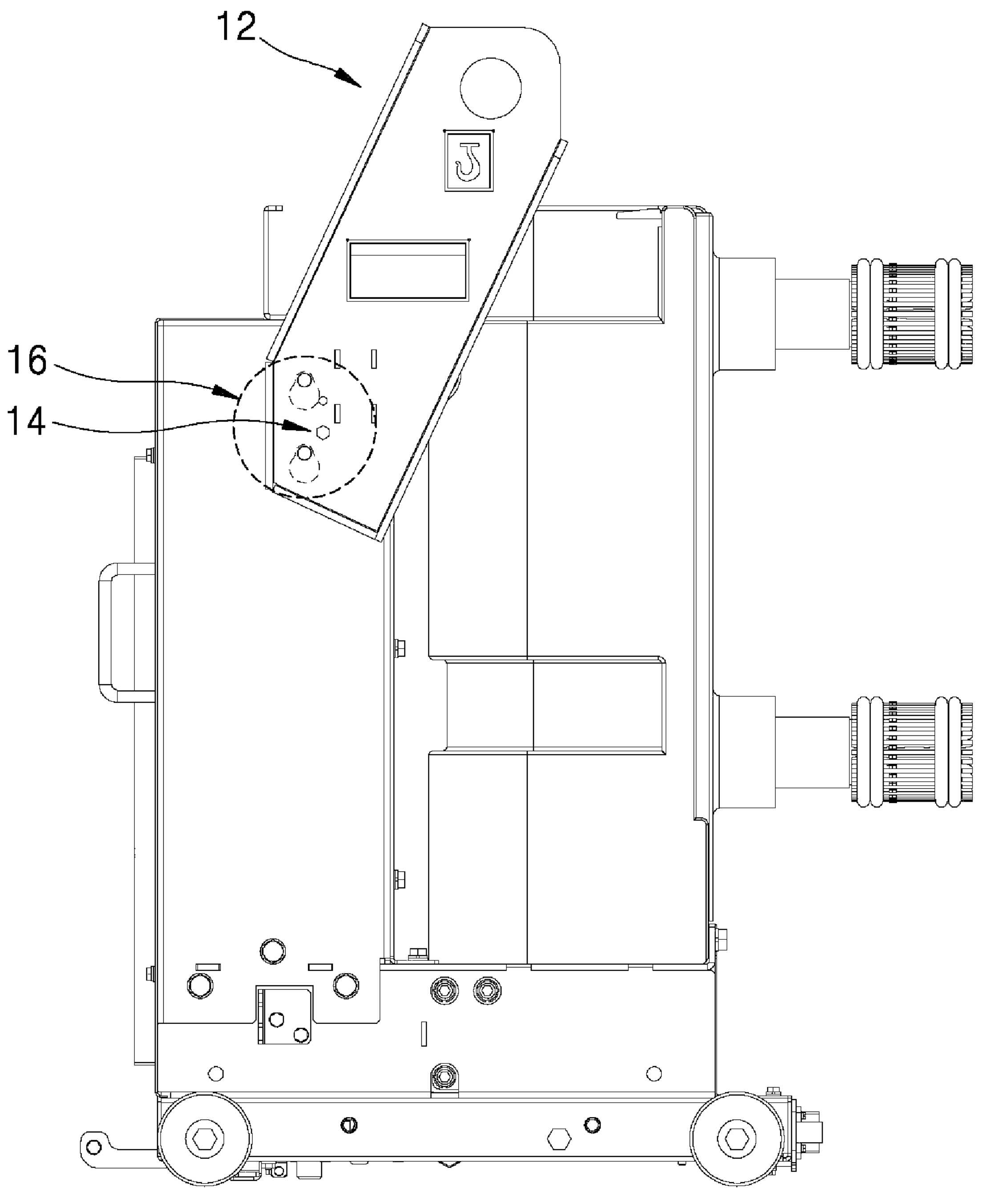
FIG. 5 is a view illustrating the lift hook of the vacuum circuit breaker that is completely assembled.
Figure 6:
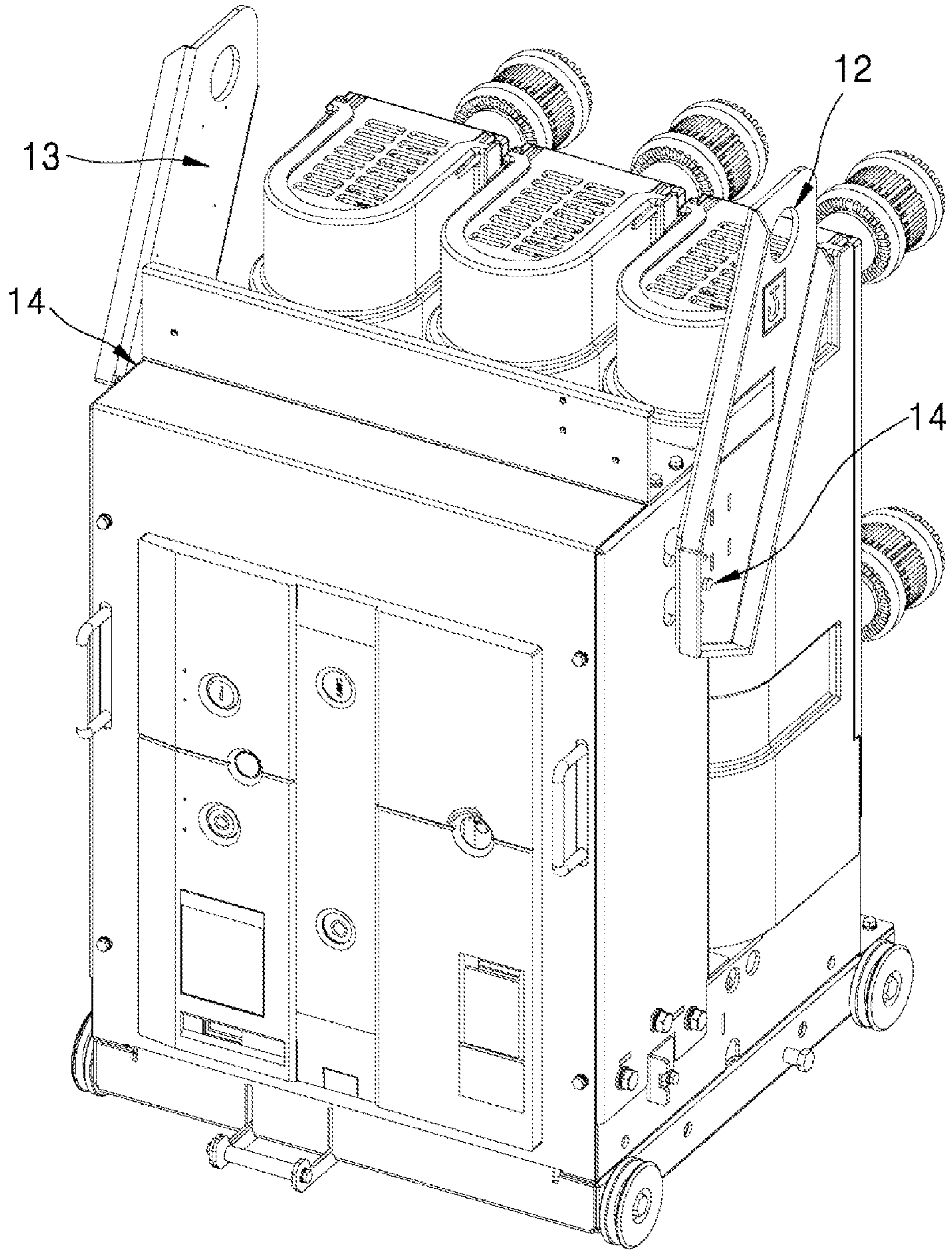
FIG. 6 is a perspective view illustrating the lift hooks of the vacuum circuit breaker after assembly is completed.

The above-described purposes, features, and advantages will be described in detail with reference to the accompanying drawings, and thus the technical spirit of the present disclosure may be easily implemented by those skilled in the art. In describing the present disclosure, detailed descriptions of well-known technologies related to the present disclosure that unnecessarily obscure the gist of the disclosure will be omitted. Hereinafter, exemplary embodiments of the present disclosure will be described in detail with reference to the accompanying drawings. The same or similar elements are denoted by the same reference numerals in the drawings.

Hereinafter, a case in which an arbitrary element is disposed "over (or under)" or "above (or below)" an element may include a case in which the arbitrary element is disposed in contact with an upper (or lower) surface of the element or a case in which still another element is interposed between the element and the arbitrary element disposed over (or under) the element.

It should be understood that, when a first element is referred to as being "connected," "coupled," or "bonded" to a second element, the first element may be directly connected or bonded to the second element, a third element may be interposed therebetween, or the elements may be connected, coupled, or bonded through other elements.

Figure 7:
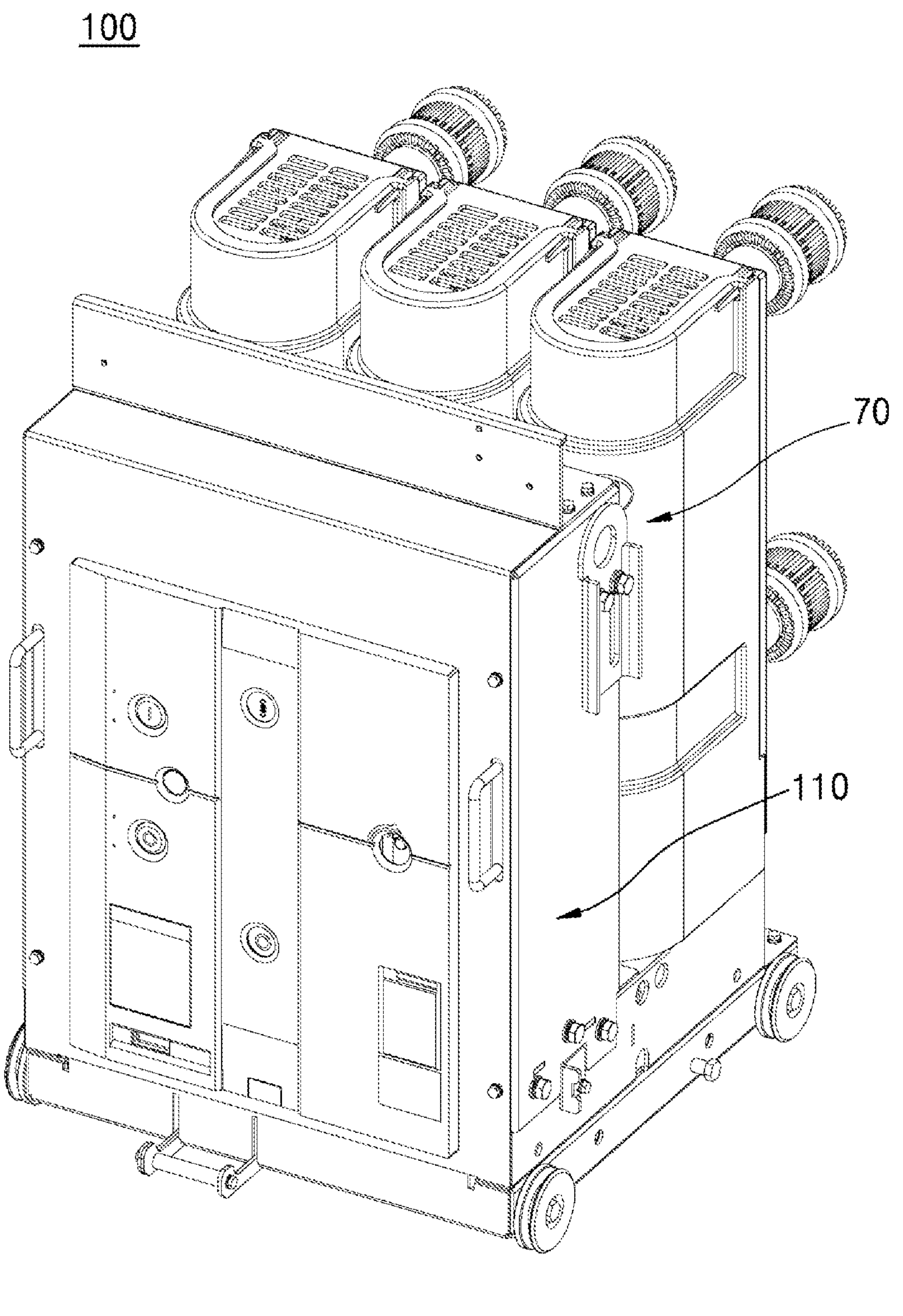
FIG. 7 is a perspective view illustrating an exterior of a vacuum circuit breaker according to a first embodiment of the present disclosure.
Figure 8:
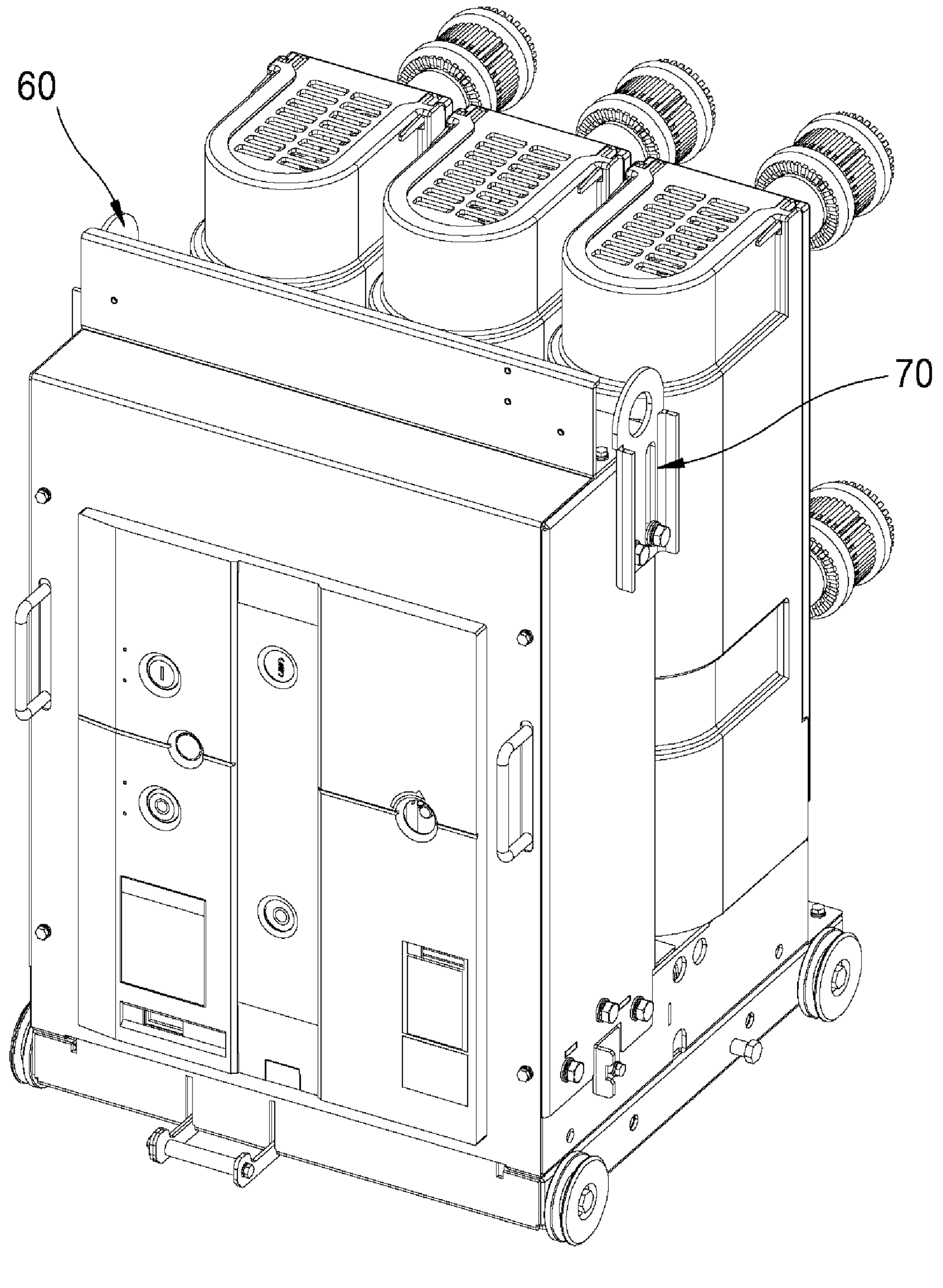
FIG. 8 is a view illustrating lift hooks mounted on both sides of a circuit breaker main body in the vacuum circuit breaker according to the first embodiment of the present disclosure.
Figure 9:
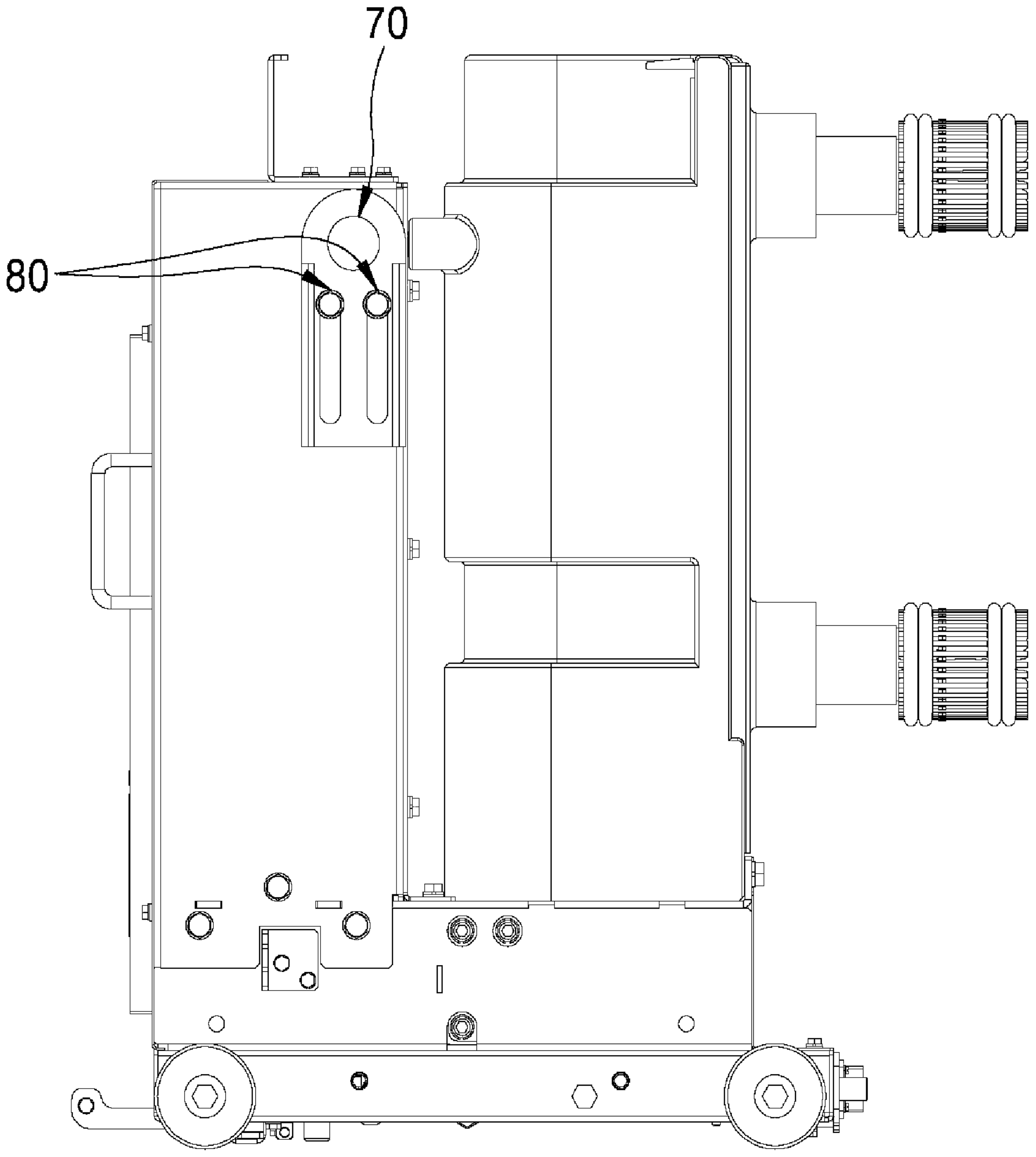
FIG. 9 is a view illustrating an example in which a lift hook is mounted on the vacuum circuit breaker by fixing bolts according to the first embodiment of the present disclosure.
Figure 10:
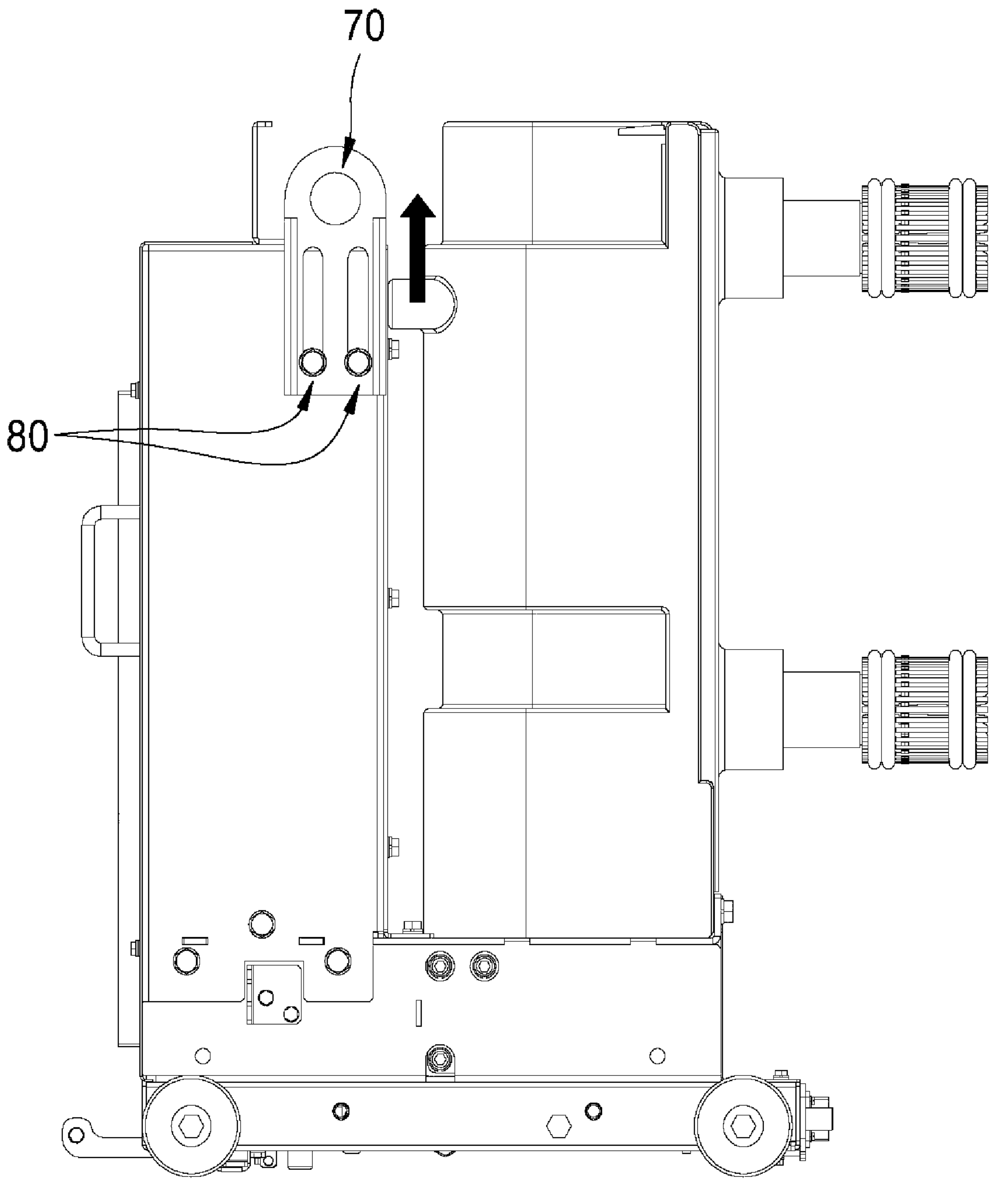
FIG. 10 is a view illustrating an example in which the lift hook mounted on the vacuum circuit breaker moves vertically due to the fixing bolts along moving holes according to the first embodiment of the present disclosure.

FIG. 7 is a perspective view illustrating an exterior of a vacuum circuit breaker according to a first embodiment of the present disclosure, and FIG. 8 is a view illustrating lift hooks mounted on both sides of a circuit breaker main body in the vacuum circuit breaker according to the first embodiment of the present disclosure. FIG. 9 is a view illustrating an example in which a lift hook is mounted on the vacuum circuit breaker by fixing bolts according to the first embodiment of the present disclosure. FIG. 10 is a view illustrating an example in which the lift hook mounted on the vacuum circuit breaker moves vertically due to the fixing bolts along moving holes according to the first embodiment of the present disclosure.

Referring to FIGS. 7 to 10, a vacuum circuit breaker 100 according to the embodiment of the present disclosure includes a circuit breaker main body 110, a plurality of fixing bolts 80, and a plurality of lift hooks 60 and 70.

Although not illustrated in the drawings, the circuit breaker main body 110 accommodates a vacuum interrupt and includes a main circuit part as generally known in the art. In addition, the circuit breaker main body 110 includes a push rod assembly and a main shaft for transmitting power to a contact point of the vacuum interrupter, and a mechanism assembly which generates driving power and is connected to the main shaft to transmit the driving power to the main shaft. The push rod assembly is coupled to one end of a moving electrode and supplies power to the moving electrode moved upward or downward by the power. In the main circuit part, the vacuum interrupter is installed in a housing. The vacuum interrupter includes an insulating container forming an accommodation space, a fixed electrode fixed to an inner upper portion of the insulating container, a fixed contact point provided at an end portion of the fixed electrode, the moving electrode vertically movably installed in an inner lower portion of the insulating container, and a moving contact point provided at an end portion of the moving electrode. The moving electrode is positioned under the fixed electrode to face the fixed electrode and moved vertically. An arc shield forming a vacuum is provided in the insulating container, and such an arc shield is installed in a shape surrounding the fixed electrode, the fixed contact point, the moving electrode, and the moving contact point. The moving contact point is brought into contact with the fixed contact point by the moving electrode (input state) or disconnected from the fixed contact point (disconnection state). Such a moving electrode is moved upward or downward by the push rod assembly.

The push rod assembly moves the moving electrode upward to input the moving electrode or downward to block the moving electrode. The push rod assembly includes several shafts, springs, and the like which transmit power of the main shaft to the moving electrode. The main shaft is connected to a lower end of the push rod assembly. The main shaft is connected to the mechanism assembly and transmits power generated from the mechanism assembly to the push rod assembly. A rod housing of the push rod assembly is positioned above the main shaft, and the rod housing is moved vertically by rotation of the main shaft.

The plurality of fixing bolts 80 are fixedly mounted on both upper sides of the circuit breaker main body 110 to store the plurality of lift hooks 60 and 70 on the circuit breaker main body 110. That is, the plurality of fixing bolts 80 are fixedly inserted into and mounted on both upper sides of the circuit breaker main body 110 in a screw coupling manner as illustrated in FIG. 8.

A plurality of moving holes 72*a* and 72*b* into which the plurality of fixing bolts 80 are inserted are formed in the plurality of lift hooks 60 and 70, and in a state in which the plurality of fixing bolts 80 are inserted into the plurality of moving holes 72*a* and 72*b*, the plurality of lift hooks 60 and 70 move vertically along the plurality of moving holes 72*a* and 72*b* in a sliding manner as illustrated in FIG. 10.

That is, in a state in which the plurality of fixing bolts 80 coupled to both upper sides of the circuit breaker main body 110 are inserted into the plurality of moving holes 72*a* and 72*b* and moved downward along the plurality of moving holes 72*a* and 72*b*, when the circuit breaker main body 110 is to be lifted and moved from the distributing board, the plurality of lift hooks 60 and 70 are moved upward by a user along the plurality of moving holes 72*a* and 72*b* in a sliding manner.

The plurality of fixing bolts 80 may be fixedly mounted on both sides of the circuit breaker main body 110 and fixedly mounted on both upper sides of the circuit breaker main body 110.

Each of the plurality of fixing bolts 80 may include a head part and a body part. In each of the plurality of fixing bolts 80, a size of the head part may be greater than a thickness of the body part. In each of the plurality of fixing bolts 80, the thickness of the body part may be smaller than or equal to a width of each of the moving holes 72*a* and 72*b*.

Embodiment for Implementing the Disclosure

Figure 11:
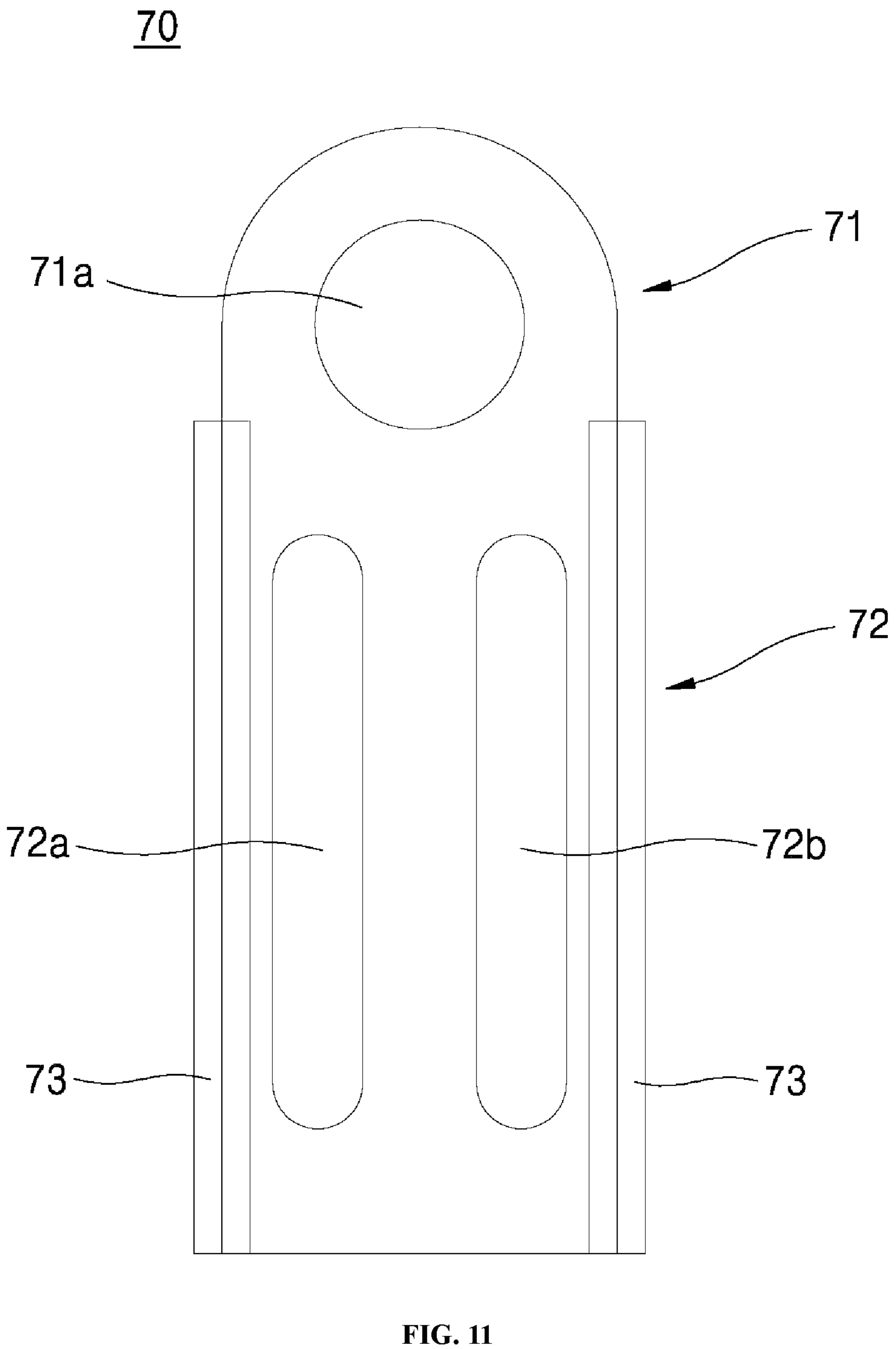
FIG. 11 is a view illustrating a detailed structure of the lift hook in the vacuum circuit breaker according to the first embodiment of the present disclosure.

FIG. 11 is a view illustrating a detailed structure of the lift hook in the vacuum circuit breaker according to the first embodiment of the present disclosure.

Referring to FIG. 11, in the vacuum circuit breaker 100 according to the first embodiment of the present disclosure, since the plurality of lift hooks 60 and 70 have the same structure, the structure of only one lift hook 70 will be described, and the one lift hook 70 may include a head part 71 and a body part 72.

The one lift hook 70 may be mounted on each side of the circuit breaker main body 110 in a state in which the plurality of fixing bolts 80 are inserted into the plurality of moving holes 72*a* and 72*b*.

In the one lift hook 70, the plurality of moving holes 72*a* and 72*b* may be formed in a longitudinal direction of the body part 72.

The plurality of moving holes 72*a* and 72*b* may be spaced a predetermined distance from each other in the body part 72.

The plurality of moving holes 72*a* and 72*b* may be spaced the predetermined distance from and parallel to each other in the body part 72.

In the one lift hook 70, a circular hook hole 71*a* having a predetermined diameter may be formed in the head part 71.

In the one lift hook 70, an outer edge of the head part 71 may be formed in an arc shape along a circular shape of the hook hole 71*a*.

In the one lift hook 70, a plurality of reinforcing parts 73 for reinforcing strength may be formed on both ends of the body part 72.

In the one lift hook 70, the plurality of reinforcing parts 73 may be formed on both ends of the body part 72 to be parallel to the plurality of moving holes 72*a* and 72*b*.

In the one lift hook 70, the plurality of reinforcing parts 73 may be formed on both ends of the outer body part 72 outside the plurality of moving holes 72*a* and 72*b* without overlapping the plurality of moving holes 72*a* and 72*b*.

In the one lift hook 70, the head part 71 may be formed to be consecutively collinear with the body part 72 on a straight line.

In the one lift hook 70, the plurality of reinforcing parts 73 may be formed on both left and right ends of the body part 72, the head part 71 may be formed to be consecutively collinear with the body part 72 on the straight line, and the plurality of reinforcing parts 73 may be formed on both left and right ends of the body part 72 formed to be consecutively collinear with the head part 71 on the straight line.

In the one lift hook 70, the plurality of moving holes 72*a* and 72*b* may have the same length, the same shape, and the same width as each other.

In the one lift hook 70, the plurality of moving holes 72*a* and 72*b* may be formed at predetermined positions of the body part 72 to have the same length and the same width and a predetermined distance therebetween.

In the one lift hook 70, the plurality of moving holes 72*a* and 72*b* may be formed in the longitudinal direction of the body part 72, in a normal case, the body part 72 may have moved down along the plurality of moving holes 72*a* and 72*b*, and when the circuit breaker main body 110 moves, the body part 72 may have moved up along the plurality of moving holes 72*a* and 72*b*.

In the one lift hook 70, the plurality of reinforcing parts 73 may be formed so that both ends of the body part 72 are folded inward or outward.

In the one lift hook 70, the plurality of reinforcing parts 73 may be formed by adhering a separate rigid material to both ends of the body part 72.

In the one lift hook 70, the material of the plurality of reinforcing parts 73 and a material of the body part 72 may be the same material.

In the one lift hook 70, the materials of the plurality of reinforcing parts 73 and the material of the body part 72 may be different materials.

In the one lift hook 70, the plurality of moving holes 72*a* and 72*b* may be formed so that two moving openings open in long elliptical shapes in the body part 72.

Figure 12:
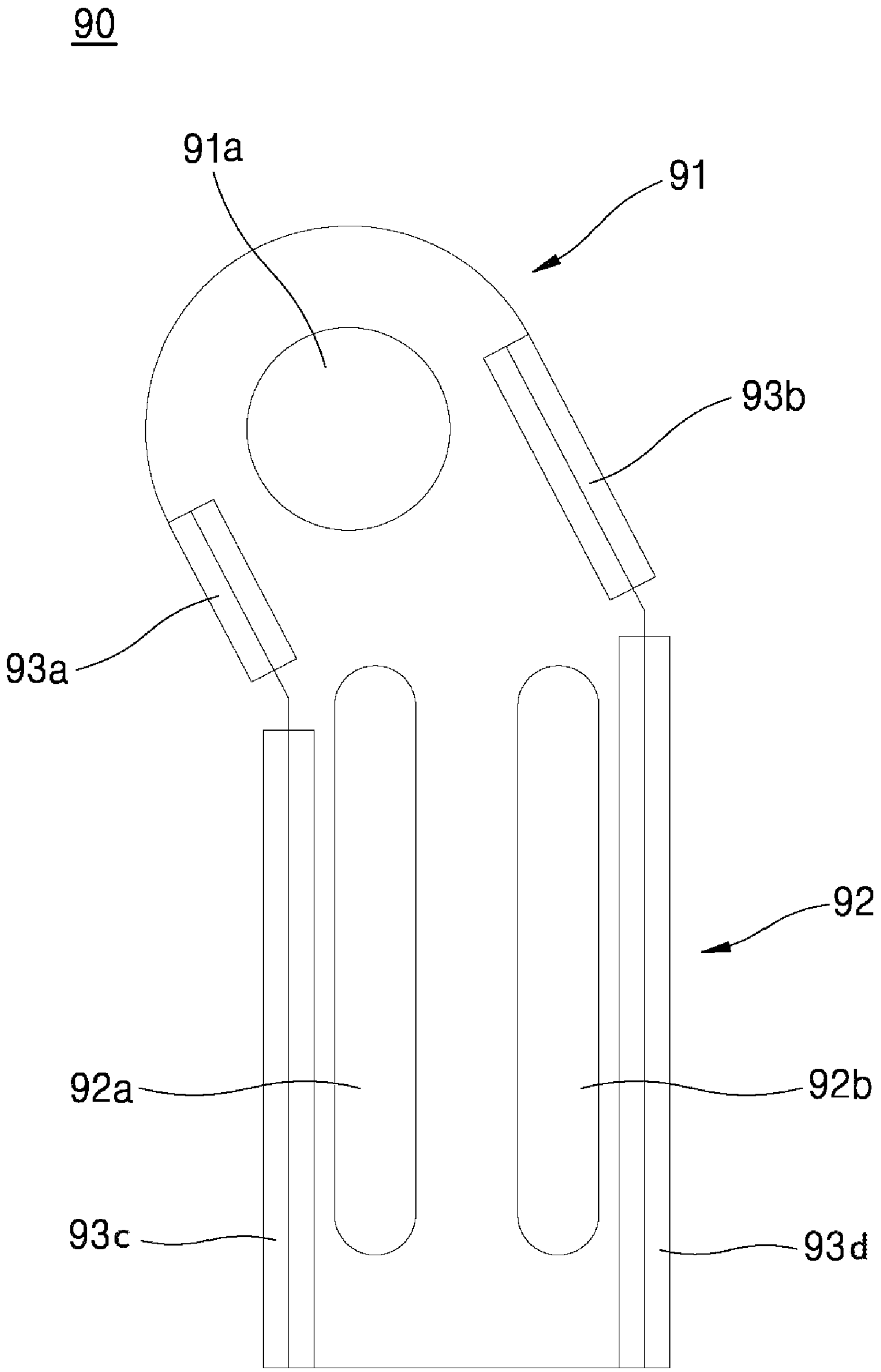
FIG. 12 is a view illustrating a detailed structure of a lift hook according to a second embodiment of the present disclosure.

FIG. 12 is a view illustrating a detailed structure of a lift hook according to a second embodiment of the present disclosure.

Referring to FIG. 12, in a lift hook 90 according to the second embodiment of the present disclosure, moving holes 92*a* and 92*b* into which a plurality of fixing bolts 80 are inserted may be formed in a body part 92, a hook hole 91*a* for lifting may be formed in a head part 91, and the head part 91 may be formed to be bent at a predetermined angle with respect to a straight line in a longitudinal direction of the body part 92.

Accordingly, a vacuum circuit breaker according to the second embodiment of the present disclosure includes a circuit breaker main body, the plurality of fixing bolts 80 fixedly mounted on the circuit breaker main body, and the lift hook 90, wherein the plurality of moving holes 92*a* and 92*b* into which the plurality of fixing bolts 80 are inserted are formed in the body part 92, the hook hole 91*a* for lifting is formed in the head part 91, and the head part 91 is formed to be bent at the predetermined angle with respect to the straight line in the longitudinal direction of the body part 92.

The lift hook 90 according to the second embodiment of the present disclosure has a structure in which the head part 91 and the body part 92 are not separated from each other and the head part 91 is formed to be connected from the body part 92.

In the lift hook 90 according to the second embodiment of the present disclosure, the head part 91 may be formed to be bent at 10 degrees to 80 degrees with respect to a line perpendicular to the longitudinal direction of the body part 92. For example, in the lift hook 90, the head part 91 may be formed to be bent at 20 degrees to 70 degrees with respect to the line perpendicular to the longitudinal direction of the body part 92.

The reason why the head part 91 is bent at the predetermined angle with respect to the line perpendicular to the longitudinal direction of the body part 92 in the lift hook 90 according to the second embodiment of the present disclosure is to prevent a vacuum circuit breaker 100 from being tilted due to a center of gravity of the vacuum circuit breaker 100 when the vacuum circuit breaker 100 is lifted from a distributing board.

In the lift hook 90 according to the second embodiment of the present disclosure, a plurality of first reinforcing parts 93*a* and 93*b* may be formed on both left and right ends of the head part 91, and a plurality of second reinforcing parts 93*c* and 93*d* may be formed on both left and right ends of the body part 92.

The plurality of first reinforcing parts 93*a* and 93*b* may have different lengths, and the plurality of second reinforcing parts 93*c* and 93*d* may have the same length.

The lift hook 90 according to the second embodiment of the present disclosure may move vertically along the plurality of moving holes 92*a* and 92*b* in a state in which the plurality of fixing bolts 80 fixedly mounted on both upper sides of a circuit breaker main body 110 are inserted into the moving holes 92*a* and 92*b* of the body part 92.

In this case, each of the plurality of fixing bolts 80 may include a head part and a body part, and a size of the head part may be greater than a thickness of the body part. In each of the plurality of fixing bolts 80, the thickness of the body part may be equal to a width of the plurality of moving holes 92*a* and 92*b* or may be smaller than the width of the plurality of moving holes 92*a* and 92*b* so that the plurality of fixing bolts 80 move freely.

The lift hook 90 according to the second embodiment of the present disclosure may be mounted on both sides of the circuit breaker main body 110 in a state in which the plurality of fixing bolts 80 are inserted into the plurality of moving holes 92*a* and 92*b*.

In the lift hook 90 according to the second embodiment of the present disclosure, the plurality of moving holes 92*a* and 92*b* may be formed in the longitudinal direction of the body part 92. The plurality of moving holes 92*a* and 92*b* may be spaced a predetermined distance from and parallel to each other in the body part 92.

In the lift hook 90 according to the second embodiment of the present disclosure, the hook hole 91*a* formed in the head part 91 may be formed to open in a circular shape in the head part 91, and a shape of an outer edge of the head part 91 may be formed in an arc shape along a circular shape of the hook hole 91*a*.

Accordingly, when the vacuum circuit breaker 100 is to be lifted from the distributing board, the lift hook 90 according to the second embodiment of the present disclosure moves upward along the plurality of moving holes 92*a* and 92*b* due to the plurality of fixing bolts 80 mounted on the circuit breaker main body 110, a hook of a crane is hooked in the hook hole 91*a* formed in the head part 91, and thus the vacuum circuit breaker 100 may be easily lifted from the distributing board without installing a separate lift hook.

As described above, according to the present disclosure, a vacuum circuit breaker in a lift hook storage type can be implemented, wherein a storage type lift hook is mounted on the vacuum circuit breaker, the lift hook is moved upward and used whenever a user needs, and the lift hook is stored after use so that user convenience is improved.

Since the above-described present disclosure may be variously substituted, modified, and changed by those skilled in the art in the range without departing from the technical spirit of the present disclosure, the present disclosure is not limited to the above-described embodiments and the accompanying drawings.

The present disclosure can be applied to an electrical protector which uses a dielectric strength of a vacuum to protect a load device and a line from an accident current when an accident such as a short circuit or ground fault occurs in an electrical circuit.

What is claimed is:

1. A vacuum circuit breaker comprising:

a circuit breaker main body;

a plurality of fixing bolts fixedly mounted on an upper side of the circuit breaker main body relative to an installed orientation of the circuit breaker main body relative to gravity; and a lift hook in which a plurality of moving holes are defined on a first end and a hook hole is defined on a second end, opposite to the first end, wherein the lift hook is movable along the plurality of moving holes in a sliding manner relative to the circuit breaker main body between a first state and a second state such that the hook hole is exposed as a through hole in the first state and that the hook hole is blocked by the circuit breaker main body in the second state, wherein the plurality of fixing bolts are inserted into the plurality of moving holes and configured to support a weight of the circuit breaker main body when suspended via the lift hook.

2. The vacuum circuit breaker of claim 1, wherein the plurality of fixing bolts are fixedly mounted on both sides of the circuit breaker main body.

3. The vacuum circuit breaker of claim 1, wherein each of the plurality of fixing bolts includes a head part and a body part; and wherein the plurality of fixing bolts has a size of the head part is greater than a thickness of the body part.

4. The vacuum circuit breaker of claim 3, wherein, in each of the plurality of fixing bolts, the thickness of the body part is equal to or less than a width of an individual moving hole of the plurality of moving holes.

5. The vacuum circuit breaker of claim 1, wherein the lift hook is a first lift hook of a plurality of lift hooks, where the first lift hook is mounted on a first side of the circuit breaker main body and a second lift hook of the plurality of lift hooks is mounted on a second side of the circuit breaker main body each in a state in which the plurality of fixing bolts are inserted into the plurality of moving holes.

6. The vacuum circuit breaker of claim 1, wherein the lift hook includes a head part and a body part.

7. The vacuum circuit breaker of claim 6, wherein, in the lift hook, the plurality of moving holes are formed in a longitudinal direction of the body part.

8. The vacuum circuit breaker of claim 6, wherein the plurality of moving holes are spaced a predetermined distance from and parallel to each other in the body part.

9. The vacuum circuit breaker of claim 6, wherein, in the lift hook:

a plurality of reinforcing parts for reinforcing strength are formed on both ends of the body part; and the plurality of reinforcing parts are formed on both ends of the body part to be parallel to the plurality of moving holes.

10. The vacuum circuit breaker of claim 6, wherein, in the lift hook, the head part and the body part are consecutively collinear with each other on a straight line.

11. The vacuum circuit breaker of claim 6, wherein, in the lift hook:

the plurality of moving holes are formed in a longitudinal direction of the body part;

in a normal case, the body part moves downward relative to the installed orientation with respect to gravity along the plurality of moving holes; and when the circuit breaker main body moves, the body part moves upward relative to the installed orientation with respect to gravity along the plurality of moving holes.

12. The vacuum circuit breaker of claim 6, wherein, in the lift hook, the head part is formed to be bent at a predetermined angle with respect to a straight line in a longitudinal direction of the body part.

13. The vacuum circuit breaker of claim 12, wherein the head part is formed to be bent at an angle of 10 degrees to 80 degrees with respect to a line perpendicular to the longitudinal direction of the body part.

14. The vacuum circuit breaker of claim 12, wherein, in the lift hook:

a plurality of first reinforcing parts are formed on both left and right ends of the head part; and a plurality of second reinforcing parts are formed on both left and right ends of the body part.

15. The vacuum circuit breaker of claim 14, wherein:

the plurality of first reinforcing parts have different lengths relative to one another; and the plurality of second reinforcing parts have equivalent lengths relative to one another.

16. A vacuum circuit breaker comprising:

a circuit breaker main body;

a plurality of fixing bolts fixedly mounted on the circuit breaker main body; and a lift hook, including in which a plurality of moving holes are formed and which is moved along the plurality of moving holes in a sliding manner, wherein the plurality of fixing bolts are inserted into the plurality of moving holes, wherein the lift hook includes a head part and a body part, wherein, in the lift hook:

a plurality of reinforcing parts for reinforcing strength are formed on both ends of the body part; and the plurality of reinforcing parts are formed on both ends of the body part to be parallel to the plurality of moving holes.

17. A vacuum circuit breaker comprising:

a circuit breaker main body;

a plurality of fixing bolts fixedly mounted on the circuit breaker main body; and a lift hook, including in which a plurality of moving holes are formed and which is moved along the plurality of moving holes in a sliding manner, wherein the plurality of fixing bolts are inserted into the plurality of moving holes, wherein the lift hook includes a head part and a body part, wherein, in the lift hook, the head part is formed to be bent at a predetermined angle with respect to a straight line in a longitudinal direction of the body part.

* * * * *